US009374246B2

(12) United States Patent
MacKerron et al.

(10) Patent No.: US 9,374,246 B2
(45) Date of Patent: Jun. 21, 2016

(54) RADIO FREQUENCY DIGITAL RECEIVER SYSTEM AND METHOD

(75) Inventors: Graham Henry MacKerron, Basildon (GB); Bernerd Mulgrew, Basildon (GB)

(73) Assignees: SELEX ES LTD, Essex (GB); THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 0 days.

(21) Appl. No.: 14/004,352

(22) PCT Filed: Mar. 9, 2012

(86) PCT No.: PCT/EP2012/054146
§ 371 (c)(1),
(2), (4) Date: Nov. 12, 2013

(87) PCT Pub. No.: WO2012/120126
PCT Pub. Date: Sep. 13, 2012

(65) Prior Publication Data
US 2014/0086365 A1    Mar. 27, 2014

(30) Foreign Application Priority Data
Mar. 10, 2011    (GB) .................................. 1104107.6

(51) Int. Cl.
| | |
|---|---|
| H04L 27/00 | (2006.01) |
| H04L 25/02 | (2006.01) |
| G01S 7/292 | (2006.01) |
| G01S 13/90 | (2006.01) |

(52) U.S. Cl.
CPC ............... *H04L 25/022* (2013.01); *G01S 7/292* (2013.01); *G01S 13/90* (2013.01)

(58) Field of Classification Search
CPC . H04L 5/0007; H04L 25/0202; H04L 27/265; H04L 27/14; H04L 2027/0024; H04L 25/024; H04L 27/263; H04W 72/085; H04W 24/02; H04B 1/005; H04B 1/0003; H04B 1/06
USPC ......... 375/147, 260, 284, 285, 340, 346, 347, 375/350; 342/192, 195, 196
See application file for complete search history.

(56) References Cited

U.S. PATENT DOCUMENTS

| | | |
|---|---|---|
| 5,349,359 A | 9/1994 | Dallaire et al. |
| 5,686,922 A | 11/1997 | Stankwitz et al. |

(Continued)

FOREIGN PATENT DOCUMENTS

| | | |
|---|---|---|
| WO | WO 97/12257 A1 | 4/1997 |
| WO | WO 2008/014243 A1 | 1/2008 |

OTHER PUBLICATIONS

International Preliminary Report on Patentability issued on Sep. 10, 2013 by the European Patent Office as the International Searching Authority for International Application No. PCT/EP2012/054146.

(Continued)

*Primary Examiner* — Dac Ha
(74) *Attorney, Agent, or Firm* — Buchanan Ingersoll & Rooney PC

(57) ABSTRACT

A radio frequency digital receiver system and method is described in which the radio frequency digital receiver system uses a discrete Fourier transform where detection decisions are made based on a spectral estimate. The spectral estimate is formed from an output of the, in which the spectral estimate is improved by enabling spatially variant apodization (SVA) such that the detection ability of the RF digital receiver is improved. In a further embodiment, the SVA is optimized for use with Digital Signal Processing.

12 Claims, 3 Drawing Sheets

(56) References Cited

U.S. PATENT DOCUMENTS

| | | | |
|---|---|---|---|
| 6,298,363 B1 | 10/2001 | Iannuzzelli | |
| 7,546,208 B2* | 6/2009 | Bosch-Charpenay et al. | 702/1 |
| 8,232,915 B2* | 7/2012 | Peterson | 342/192 |
| 8,533,249 B2* | 9/2013 | Aoki et al. | 708/300 |
| 2003/0142764 A1* | 7/2003 | Keevill | H04L 27/265 375/341 |
| 2007/0025421 A1* | 2/2007 | Shattil | 375/136 |

OTHER PUBLICATIONS

International Search Report (PCT/ISA/210) mailed on May 11, 2012, by the European Patent Office as the International Searching Authority for International Application No. PCT/EP2012/054146.

Written Opinion (PCT/ISA/237) mailed on May 11, 2012, by the European Patent Office as the International Searching Authority for International Application No. PCT/EP2012/054146.

United Kingdom Search Report issued on Jul. 11, 2011.

Gabriel Thomas et al., "Sidelobe Apodization in Fourier Imaging", Conference Record of the 35$^{th}$ Asilomar Conference on Signals, Systems, & Computers, Nov. 4-7, 2001, pp. 1369-1373, XP-032139919.

Ji Huibo et al., "A Modified Apodization Method in SAR/ISAR Processing", Proceedings IEEE International Geoscience and Remote Symposium, vol. 6, Jul. 21, 2003, pp. 3991-3994, XP-010703758.

Brian Hendee Smith, "Generalization of Spatially Variant Apodization to Noninteger Nyquist Sampling Rates", IEEE Transactions on Image Processing, vol. 9, No. 6, Jun. 1, 2000, pp. 1088-1093, XP-011025612.

* cited by examiner

RADIO FREQUENCY DIGITAL RECEIVER SYSTEM AND METHOD

The invention relates to Radio Frequency (RF) digital receivers. More specifically, but not exclusively, it relates to RF digital receivers used for the detection of targets which use a 1-dimensional discrete Fourier transform (DFT) with a particular window function applied to a data capture window (DCW) before the DFT.

It is standard practice, in an RF digital receiver which uses a discrete Fourier transform (DFT), to select a particular window function, sometimes called a data taper, to be applied before a DFT block (as shown in FIG. 1). Once selected, the properties of this window function apply to all frequency bins at the output of the DFT block. If a different window function is required with different associated properties at the frequency bins, the best solution currently available is to wait until the DFT block finishes processing the current DCW. Subsequently the different window function would be loaded and applied to the next DCW. The properties of the different window function would apply to all the frequency bins at the output of the DFT block.

The actual choice of window function (which can be interpreted as a filter) is a trade-off between the metrics of filter frequency-domain response, such as noise equivalent bandwidth (NEB); sidelobe levels; scalloping loss; 3 dB resolution and 6 dB resolution. Window functions that tend to have low sidelobe levels also have a poorer frequency resolution and a poorer NEB (an example of which is a Hamming window). These trade-off factors create problems for detection in RF digital receivers:

Firstly, poorer frequency resolution creates difficulty in finding signals closely spaced in frequency.

Secondly, an increase in NEB is effectively a loss in algorithmic processing gain which ultimately leads to a loss in the detection range of the RF digital receiver.

Thirdly, high sidelobe levels cause difficulty in finding weak signals in the presence of strong signals whose sidelobes tend to mask them.

Decision rules are necessary to make sense of the spectral estimate formed from the output of the DFT block. The decision rules are essentially an algorithmic description of the frequency-domain response of the window function used in front of the DFT. Such decision rules are standard practice and typically sub-optimal if there are closely spaced signals.

A known technique in the field of adaptive windowing is described in U.S. Pat. No. 5,349,359 where use of spatially variant apodization (SVA) is disclosed for use in an image-processing system. Furthermore the formulation of SVA used in this patent is believed to operate on real and imaginary data sets separately.

U.S. Pat. No. 6,298,363 describes adaptive windowing of FFT data for increased resolution and sidelobe rejection in a system. However, this only applies to the use of a joint 5-point SVA formulation, a joint 7-point SVA formulation and a formulation which selects the minimum from the results of the joint 5-point and 7-point SVA formulations.

Furthermore, "Nonlinear Apodization for Sidelobe Control in SAR Imagery," IEEE Trans. On Aerospace and Elect. Syst., Vol. 31, No. 1, pp. 267-279, January 1995 by H. C. Stankwitz, R. J. Dallaire and J. R. Fienup, derives two formulations of 3-point SVA: one where it operates separately on real and imaginary parts of data sets and one where it operates on real and imaginary parts jointly. The joint 3-point formulation of SVA is the type used in this device.

Such prior applications of SVA have concentrated on the use of SVA in imaging systems and in particular SAR imagery. Furthermore, previous systems using SVA have mentioned only the formulation of the 3-point SVA from the separate real and imaginary parts of data sets or the formulation of the joint 5-point and joint 7-point SVA. No prior applications have mentioned optimising SVA for digital signal processing (DSP).

The present invention, as described in more detail below, is mostly similar to conventional RF digital receivers which use a DFT except for the removal of a window function, the removal of decision rules and the addition of SVA. In one form of the invention, SVA is optimised for DSP.

The SVA technique effectively improves the spectral estimate by minimising sidelobes whilst maintaining the frequency-domain mainlobe resolution of a rectangular window function. This leads to optimised detection in the RF digital receiver.

The invention differs from prior applications of SVA such as those described above as it is used in a detection role in an RF digital receiver and in one form of the invention is optimised for DSP.

The invention aims to overcome window function-related limitations of conventional RF digital receivers (see FIG. 1 for a diagram of such a receiver).

According to the invention there is provided a radio frequency (RF) digital receiver system for detecting RF signals using discrete Fourier transform (DFT) means where detection decisions are made based on a spectral estimate formed from an output of the DFT means, in which the spectral estimate is improved by incorporating means for enabling spatially variant apodization (SVA) such that the detection ability of the RF digital receiver is improved.

According to the invention there is further provided a method of detecting radio frequencies comprising the steps of applying spatially variant apodization (SVA) to a signal received by an antenna said signal being indicative of a detected radio frequency; then outputting said signal to means for applying a discrete Fourier transform such that the SVA means selects the optimum function for producing a spectral estimate representative of the signal detected by the antenna.

As will be described later, the use of SVA at the output of the DFT block means both the window function block and decision rules block can be removed from the RF digital receiver and crucially, the trade-off between the factors described above is avoided and therefore detection is optimised.

In essence, SVA in this invention is used in a detection role and in one form of the invention it is applied in a manner optimised for DSP.

The invention will now be described with reference to the following diagrammatic drawings in which.

Figure 1:
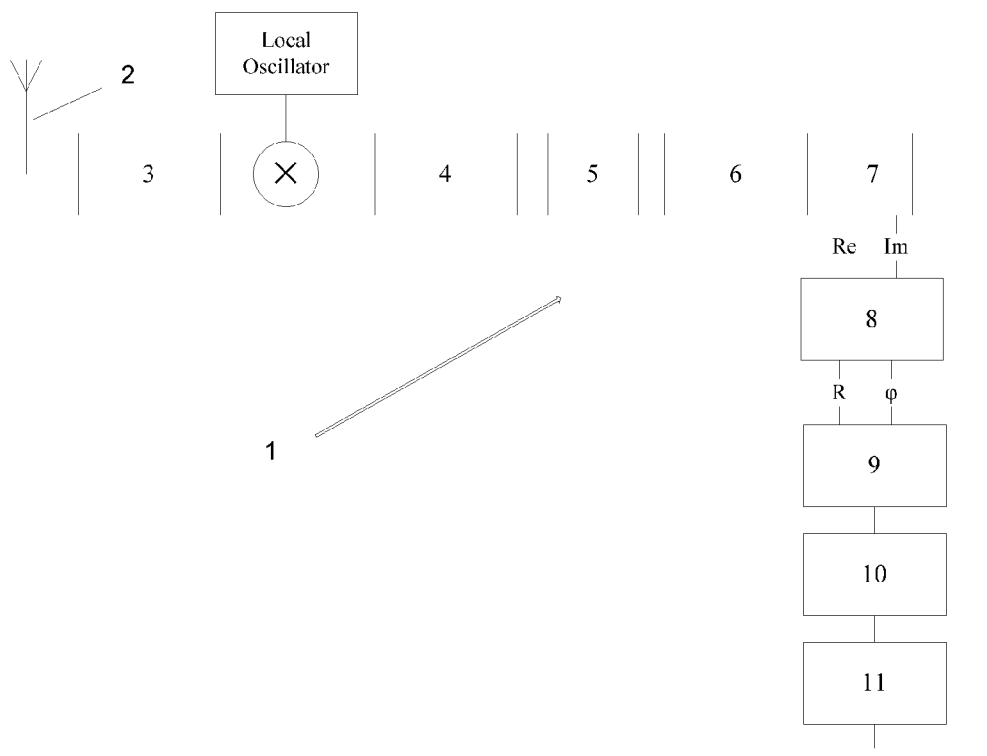
FIG. 1 shows a schematic block diagram of one form of known radio frequency digital receiver.

FIG. 1 shows a block diagram of a conventional, known RF digital receiver 1. The exact RF digital receiver architecture may vary, however the key stages needed for detection are shown in FIG. 1. A signal is received at the antenna 2 input to a low noise amplifier 3 then transmitted via further amplification means 4 to an Analog to Digital Converter (ADC) 5. The ADC sends groups of sequences of samples, called DCWs, to be weighted by a window function applied via suitable means 6. The choice of window function applied at 6 constrains the spectral estimate to a particular frequency resolution (related to the mainlobe width of the frequency-domain response of the window function), a particular level of sidelobe spectral leakage and a particular processing loss (due to the NEB of the window). These factors may only be traded-off against each other and changed on a per-DCW basis by loading an alternative window function after the DFT has processed the current DCW. The signal output at 6 has a discrete Fourier transform (DFT) applied by suitable means at 7 which is then converted into polar co-ordinates at 8 to form a spectral estimate 9. This is then compared against a detection threshold via suitable comparison means 10 and decision rules 11 applied to output final detection decisions for each frequency bin 12.

Figure 2:
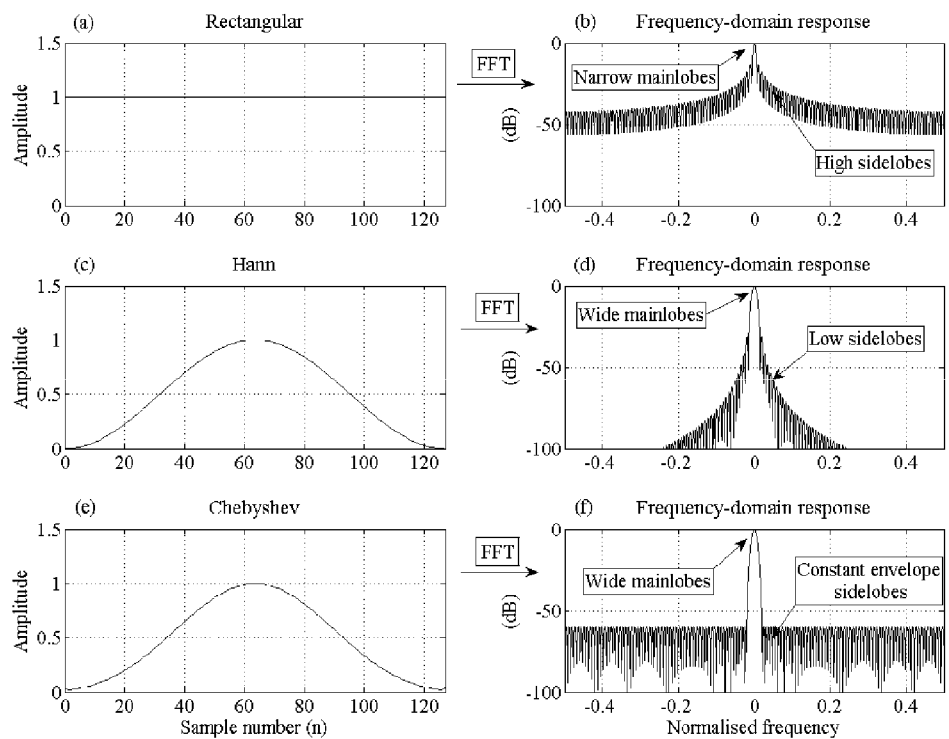
FIG. 2 shows a series of graphs representing window functions and frequency-domain responses for the radio frequency receiver of FIG. 2.

For example in FIG. 2(a) the rectangular window has a frequency-domain response shown in panel (b) which has good frequency resolution (narrow mainlobe) but poor spectral leakage protection (high sidelobes). In FIG. 2(c) the Hann window has the opposite properties. This is shown in panel (d) it has poor frequency resolution (wide mainlobe) but good spectral leakage protection (low sidelobes). Moreover, due to the attenuation of samples at the ends of the Hann and Chebyshev window functions in FIGS. 2 (c) and (e) they suffer a processing loss, where some signal power is attenuated.

The decision rules means 11 in FIG. 1 is required to describe the pattern of the frequency-domain response of the window function which was chosen. This logic is necessary to prevent false detections due to high sidelobes or wide mainlobes. An example of such a decision rule might state that if a large spectral peak is found in one frequency bin and if a Hann window function was used, then no detections are permitted in the immediate neighbour bins because they are likely to be due to the wide mainlobe.

Figure 3:
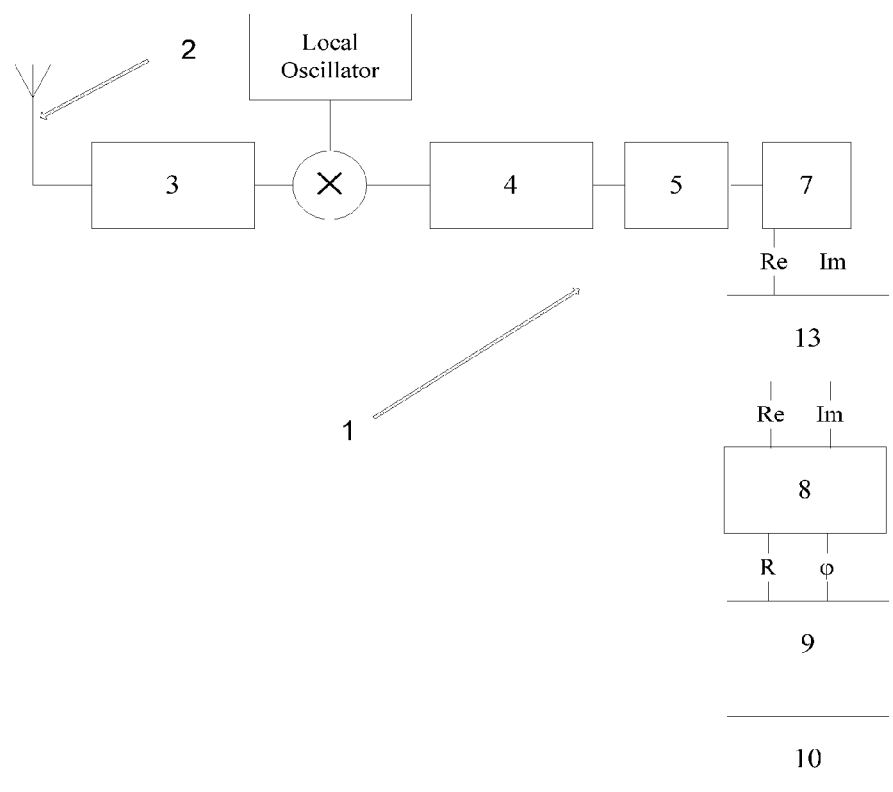
FIG. 3 shows a schematic block diagram of a radio frequency digital receiver in accordance with one form of the invention, including SVA means 13 after means for applying a Discrete Fourier Transform (DFT) 7.

FIG. 3 shows the block diagram for the invention RF digital receiver 1 which incorporates the joint, 3-point SVA technique into the data flow. Features shared between the system in FIG. 1 and FIG. 3 have the same reference numerals.

In FIG. 3, the device is an RF digital receiver which utilises the joint, 3-point SVA technique (SVA) via suitable means 13 after the DFT means 7, instead of the application of a window function by suitable means 6 before the DFT means 7. The ADC 5 sends DCWs to be processed by the DFT 7, from which the complex output is processed by SVA 13. The SVA technique effectively allows each frequency bin to have its own corresponding time-domain window function chosen from the family of raised-cosine window functions. The SVA technique chooses the optimum window function from this family according to a simple power minimisation equation (see Equation 1). After the application of SVA 13, a spectral estimate is formed 9 which is thresholded via suitable comparison means 10 for spectral peaks. Decision rules 11 to sort through the various spectral peaks are not used.

The important changes to the generic RF digital receiver from FIG. 1 to FIG. 3 are the removal of the window function means 6, the removal of the decision rules means 11 and the insertion of SVA means 13 which in one form of the invention is optimised for DSP.

The SVA means 13 effectively applies an algorithm that selects the optimum window function for each frequency bin from the raised-cosine family of window functions. Therefore both low sidelobes and narrow mainlobe can be achieved at the same time, greatly reducing the reliance on the decision rules means 11 to the point where they can be omitted in FIG. 3. The processing loss which occurs in the system in FIG. 3 when anything other than a rectangular window function is used means 6 is also recovered from the use of SVA means 13.

To show the SVA optimisations for DSP in one form of the invention it is necessary to detail the mathematics of the algorithm. The SVA algorithm involves two stages:

1) Calculation of a parameters at each frequency bin according to the equation:

$$\alpha = \Re\left\{\frac{X(k)}{X(k+1) + X(k-1)}\right\} \qquad \text{Equation 1}$$

2) Application of the α parameters to each frequency bin according to the following set of equations:

$$X_a(k) = \begin{cases} X(k), & \text{for } \alpha < 0 \\ X(k) - \alpha(X(k+1) + X(k-1)), & \text{for } \left\{0 \le \alpha \le \frac{1}{2}\right\} \\ X(k) - \frac{1}{2}(X(k+1) + X(k-1)), & \text{for } \alpha > \frac{1}{2} \end{cases} \qquad \text{Equation 2}$$

Equation 1 expanded into real and imaginary parts is:

$$\alpha = \frac{I(k)[I(k+1) + I(k-1)] + Q(k)[Q(k+1) + Q(k-1)]}{[I(k+1) + I(k-1)]^2 + [Q(k+1) + Q(k-1)]^2} \qquad \text{Equation 3}$$

From inspection of Equation 3, the divisor is real and positive and the sign of the dividend determines the sign of a. If the dividend is less than or equal to zero, it follows that α is less than or equal to zero. Therefore from Equation 2 no further mathematical operations on the processed frequency bin are required.

The first step which SVA-optimised-for-DSP follows is to calculate the dividend. This is achieved as multiply-accumulate (MACC) operations in Table 1. A check is performed whether the sign bit of the dividend is negative (shown as a sign test in Table 1) or if all bits in the word are zero (shown as an "OR" short circuit operation in Table 1). If either of these tests is true no further processing on that particular frequency bin is undertaken (i.e the division operation in Equation 3 and operations in Equation 2 for that frequency bin are not calculated). This saves on either computational time or power consumption depending on whether the SVAoptimised-for-DSP is implemented as a procedure or as a pipeline.

TABLE 1

| MACC Operation | Intermediate Result in Register |
|---|---|
| Multiply | $I(k)I(k+1)$ |
| Accumulate | $I(k)I(k+1)$ |
| Multiply | $I(k)I(k-1)$ |
| Accumulate | $I(k)I(k+1) + I(k)I(k-1)$ |
| Multiply | $Q(k)Q(k+1)$ |
| Accumulate | $I(k)I(k+1) + I(k)I(k-1) + Q(k)Q(k+1)$ |
| Multiply | $Q(k)Q(k-1)$ |
| Accumulate | $I(k)I(k+1) + I(k)I(k-1) + Q(k)Q(k+1) + Q(k)Q(k-1)$ |
| Logic Operation | Pseudo-code |
| sign test OR | if (bitget (acc_reg, MSB) \|\| Short-circuitOR |
| all zeros | (acc_reg) ==0) |

In the calculation of the dividend, the "sum of the neighbour frequency bins" is calculated. This is the quantity $X(k+1)+X(k-1)=[I(k+1)+I(k-1)]+i[Q(k+1)+Q(k-1)]$. This quantity is stored in memory for later use.

If the test whether the dividend is less than or equal to zero in Table 1 comes back false, then the SVA-optimised-for-DSP moves onto its next steps and recalls the "sum of the neighbour frequency bins". The actual division is performed with the use of the dividend (which was calculated and stored in acc_reg in Table 1) as follows:

$$\alpha = \frac{acc\_reg}{[I(k+1) + I(k-1)]^2 + [Q(k+1) + Q(k-1)]^2}$$

A test is applied to the quotient which is returned from the division as to whether it is greater than or equal to ½. In this invention this test is performed by appending the first fractional bit of the quotient to the integer bits of the quotient and applying an OR short circuit operation. If this test is returned as true, a "barrel" shift operation one place to the right is performed on the "sum of the neighbour frequency bins" (shift denoted in Table 2 as "»"). A barrel shift operation is computationally much simpler than a multiplication which allows a saving to be made on either computational time or power consumption depending on whether the SVA-optimised-for-DSP is implemented as a procedure or as a pipeline.

If the test whether the quotient is greater than or equal to ½ is returned as false then in this form of the invention the fractional bits (except the bit which represents $2^{-1}$) from the quotient are used to multiply with the real and imaginary parts of the "sum of the neighbour frequency bins". The result from this multiplication is then subtracted from the real and imaginary parts of the frequency bin under test.

Figure 4:
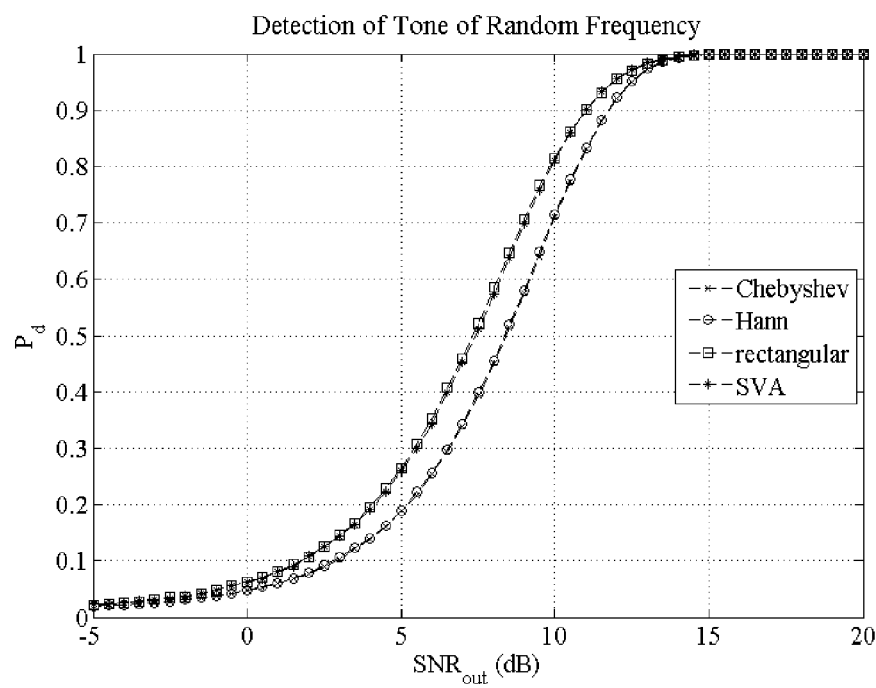
FIG. 4 shows a graph of a receiver operating characteristic for an RF digital receiver, namely detection of one tone against white noise, for a system such as that shown in FIG. 3.
Figure 5:
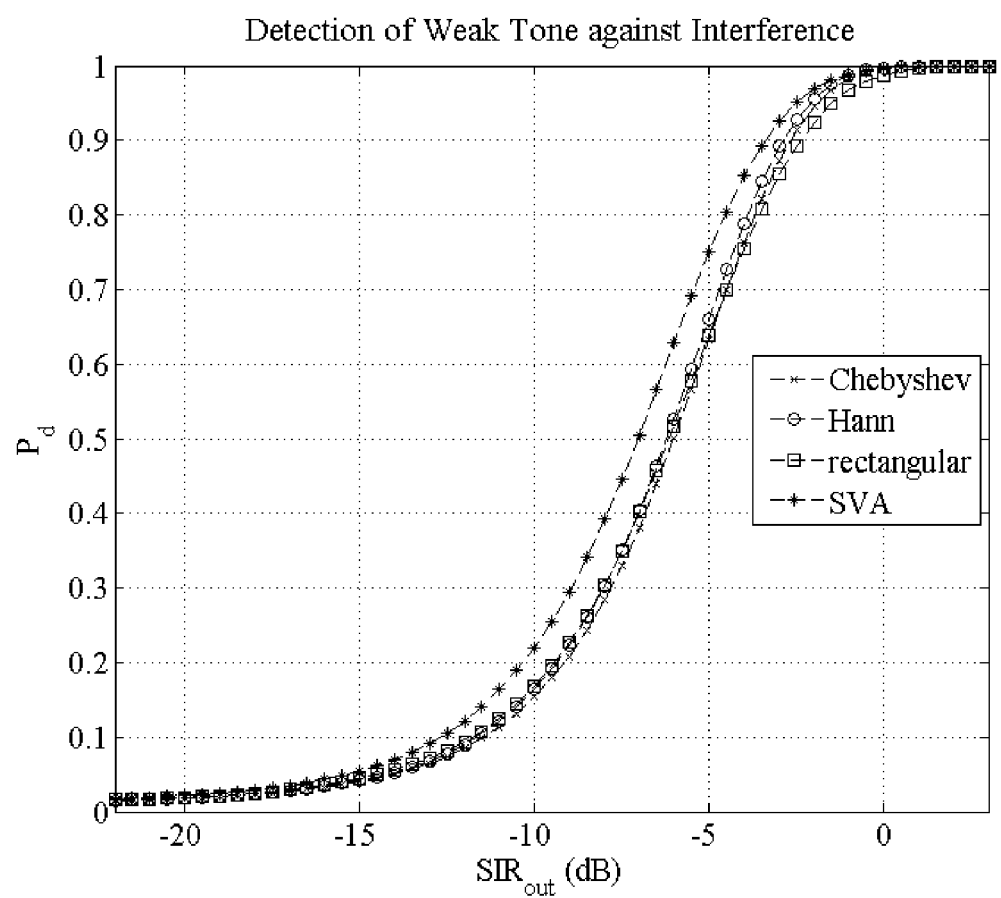
FIG. 5 shows a graph of a further receiver operating characteristic for an RF digital receiver, namely detection of one signal against interference tone and white noise, for a system such as that shown in FIG. 3.

As an example of the detection performance advantages SVA affords when used in a detection role in an RF digital receiver, receiver operating characteristic graphs are shown in FIG. 4 and FIG. 5. These results were obtained from models of simulated RF digital receivers. Similar results have been obtained from actual field-programmable gate array (FPGA) implementations of these simulated receivers. Both figures are produced from 100,000 test events and compare the performance of the conventional RF digital receiver from FIG. 1 against the RF digital receiver which utilises SVA from FIG. 3. The conventional RF digital receiver has been simulated with one window function means 6 out of a choice of a: Chebyshev, Hann or rectangular window. The two figures are produced from two different scenarios.

FIG. 4 shows the results of the RF digital receivers attempting to detect a single tone of random frequency. FIG. 5 shows the results of the RF digital receivers attempting to detect a weaker random frequency tone in the presence of a stronger random frequency tone. The weaker and stronger tones were close in frequency and were separated by a nominal frequency spacing equivalent to two DFT frequency bins. However the exact spacing varied because the frequencies were chosen at random over a frequency bin interval. $SNR_{out}$ in FIG. 4 refers to the signal-to-noise ratio at the output of the DFT block and $SIR_{out}$ in FIG. 5 refers to the signal-to-interference ratio at the output of the DFT block. $P_d$ stands for the probability of detection in both figures. The probability of false alarm chosen for the simulations was 0.01.

FIG. 4 demonstrates the RF digital receiver which utilised the SVA technique matched the performance of the rectangular-windowed, conventional RF digital receiver and surpassed the performance of the Chebyshev- and Hann-windowed, conventional RF digital receivers. FIG. 4 shows the use of SVA in an RF digital receiver was able to match the performance of a rectangular-windowed RF digital receiver. From this alone it would appear that there is little advantage in using the SVA technique over the rectangular window function. However this scenario favours the use of the rectangular window because the RF digital receivers sought only to detect one signal and therefore sidelobe levels were ignored.

FIG. 5 shows the RF digital receiver which utilised the SVA technique gave the best detection performance. Many factors become relevant during the detection of one signal in close frequency proximity to another, such as sidelobe levels, mainlobe width and processing loss. Since the SVA technique optimises all of these factors, the RF digital receiver which used SVA gave the best performance for this scenario.

From these two example scenarios the use of the RF digital receiver from FIG. 3 which incorporates SVA into its data flow results in optimised detection.

TABLE 2

| Operation | $\alpha \geq 0.5$ Intermediate Result | Operation | $0 < \alpha < 0.5$ Intermediate Result |
|---|---|---|---|
| Real Part | | | |
| Shift | $I(k+1) + I(k-1) \gg 1$ | Multiply | $\alpha(I(k+1) + I(k-1))$ |
| Subtract | $I(k) - (I(k+1) + I(k-1) \gg 1)$ | Subtract | $I(k) - \alpha(I(k+1) + I(k-1))$ |
| Imaginary Part | | | |
| Shift | $Q(k+1) + Q(k-1) \gg 1$ | Multiply | $\alpha(Q(k+1) + Q(k-1))$ |
| Subtract | $Q(k) - (Q(k+1) + Q(k-1) \gg 1)$ | Subtract | $Q(k) - \alpha(Q(k+1) + Q(k-1))$ |

The invention claimed is:

1. A radio frequency (RF) digital receiver system for detecting RF signals, comprising: an RF digital receiver including:
discrete Fourier transform (DFT) for making detection decisions on an RF signal received by an antenna based on a spectral estimate formed from an output of the DFT means; and
the RF digital receiver being configured to:
enable spatially variant apodization (SVA) to form the spectral estimate by selecting a function for producing a spectral estimate which is representative of the RF signal received by the antenna, and enhance a detection ability of the RF digital receiver,
wherein the spectral estimate for digital signal processing is formed by:
calculating parameters at each frequency bin; and applying the calculated parameters to each frequency bin according to a set of equations and determining whether further processing of a respective frequency bin is necessary based on a dividend of at least one equation in the set of equations.

2. An RF digital receiver system according to claim 1, wherein by enabling SVA the RF digital receiver is configured to impact the spectral estimate by minimising sidelobe spectral leakage whilst maintaining a frequency resolution of a rectangular window function at the same time.

3. An RF digital receiver system according to claim 1, wherein to enable SVA the RF digital receiver is configured to perform digital signal processing (DSP) to impact computational time or power consumption depending on whether SVA is implemented as a procedure or as a pipeline.

4. An RF digital receiver system according to claim 3, in which the means for enabling SVA is configured to impact the spectral estimate by minimising sidelobe spectral leakage whilst maintaining a frequency resolution of a rectangular window function at the same time.

5. An RF digital receiver according to claim 1, wherein applying the calculated parameters to each frequency bin includes calculating the dividend, wherein if the dividend is negative or if all bits in the dividend are zero, no further processing is performed on a respective frequency bin.

6. A method of detecting radio frequencies in an RF digital receiver system having an RF digital receiver connected to an antenna, the RF digital receiver including discrete Fourier transform (DFT) for making detection decision on an RF signal based on a spectral estimate formed from an output of the DFT, and the RF digital receiver being configured to enable spatially variant apodization (SVA) to form the spectral estimate, the method, comprising:
receiving the RF signal through the antenna;
applying the SVA to a signal received by an antenna, said signal being indicative of a detected radio frequency, wherein the SVA selects a function for producing a spectral estimate and forms the spectral estimate via the function by:
calculating parameters at each frequency bin; and applying the calculated parameters to each frequency bin according to a set of equations and determining whether further processing of a respective frequency bin is necessary based on a dividend of at least one equation in the set of equations;
sending said signal with applied SVA to the DFT such that the spectral estimate is representative of the signal received by the antenna; and
outputting a final detection decision for each frequency bin based on the DFT.

7. A method according to claim 4, in which the signal output with applied SVA is prepared for Digital Signal Processing.

8. A method of detecting radio frequencies, comprising:
in an RF digital receiver:
a) sampling a bandwidth in a sequence of data capture windows;
b) processing the data capture windows with a discrete Fourier-transform (DFT);
c) applying a spatially variant apodization (SVA) configured for performing digital signal processing (DSP) on an output of Fourier-transformed data from the processing, wherein applying the SVA includes:
calculating parameters at each frequency bin; and
applying the calculated parameters to each frequency bin according to a set of equations and determining whether further processing of a respective frequency bin is necessary based on a dividend of at least one equation in the set of equations;
d) forming a spectral estimate of the bandwidth from the SVA-processed data; and
e) performing detections on ordinates of the spectral estimate.

9. A method according to claim 8, in which the SVA is configured for digital signal processing (DSP) where, for each frequency bin at an output of a DFT, the method comprises:
a) calculating expressions $I(k+1)+I(k-1)$ and $Q(k+1)+Q(k-1)$ to form fixed-point words, and storing copies of the words, temporarily in memory;
b) calculating, based on the fixed-point words, $I(k)[I(k+1)+I(k-1)]+Q(k)[Q(k+1)+Q(k-1)]$ with multiply-accumulate (MACC) operations to form another fixed-point word;
c) applying a sign test and OR short-circuit operation test to bits of the another fixed-point word; and
d) terminating processing for a frequency bin if either test is returned as true, or otherwise calculating an expression $[I(k+1)+I(k-1)]^2+[Q(k+1)+Q(k-1)]^2$ with the MACC operations and the fixed-point words to form yet another a fixed-point word,
where I is a real part, Q is an imaginary part, and k is an integer representing the frequency bin.

10. A method according to claim 9, comprising:
a) dividing a signal using the another fixed-point word as dividend and the yet another fixed-point word from as divisor to form two words: one holding integer bits and one holding fractional bits;
b) appending a most significant fractional bit from the word holding fractional bits to the word holding the integer bits to form a combined fixed-point word;
c) applying a test as to whether the combined fixed-point word is greater than or equal to $\frac{1}{2}$;
d) performing a barrel shift operation one place to the right for the fixed point words to form barrel shifted resultant words; and
e) subtracting a respective resultant word from a respective frequency bin and terminating the method if the test of the combined fixed-point word is returned as true;
or otherwise multiplying each word containing the fractional bits, with a most significant bit removed, by a respective fixed-point word to produce a product associated with each respective frequency bin, and subtracting the product from the respective frequency bin with MACC operations.

11. A method according to claim 8, in which the signal output with applied SVA prepared for Digital Signal Processing.

12. A method according to claim 8, wherein the processing is performed without application of a window function, and the preforming detections are performed without detection rules logic.

* * * * *